United States Patent [19]

Okada et al.

[11] Patent Number: 4,800,976

[45] Date of Patent: Jan. 31, 1989

[54] METHOD OF CONTROLLING POWER STEERING DEVICE

[75] Inventors: Kunio Okada; Shigeru Kobayashi, both of Higashimatsuyama, Japan

[73] Assignee: Jidosha Kiki Co., Ltd., Tokyo, Japan

[21] Appl. No.: 58,980

[22] Filed: Jun. 8, 1987

[30] Foreign Application Priority Data

Jun. 11, 1986 [JP] Japan .................. 61-133887

[51] Int. Cl.$^4$ .............................................. B62D 5/06
[52] U.S. Cl. ................................... 180/142; 180/79.1
[58] Field of Search ............... 180/142, 141, 143, 79.1

[56] References Cited

U.S. PATENT DOCUMENTS 4,476,529 10/1984 Nakamura et al. ................. 180/142
4,658,927 4/1987 Kanazawa .......................... 180/142

Primary Examiner—David M. Mitchell
Assistant Examiner—Donn McGiehan
Attorney, Agent, or Firm—Townsend and Townsend

[57] ABSTRACT

A method of controlling a power steering device controls the output from the power steering device in accordance with a vehicle speed and a steering angle. According to this method, the output from the power steering device is caused to be inversely proportional to the steering angle when the vehicle speed exceeds a predetermined vehicle speed and the steering angle is below a given angle and the output from the power steering device is caused to be proportional to the steering angle when the steering angle exceeds the given angle.

5 Claims, 2 Drawing Sheets

METHOD OF CONTROLLING POWER STEERING DEVICE

BACKGROUND OF THE INVENTION

The present invention relates to a method of controlling a power steering device, which controls a steering power of a vehicle in accordance with a vehicle speed and a steering angle.

In general, a steering power of a vehicle is high when the vehicle speed is low and decreases as the vehicle speed increases. For this reason, conventionally, a power steering device is hydraulically controlled such that an oil pressure is controlled in accordance with the vehicle speed and steering angle as shown in FIG. 4. Thus, a uniform steering response is obtained throughout the entire driving range. That is, according to a power steering device wherein an output is increased as a current supplied to a solenoid valve is increased, when the vehicle speed is low, a large current is supplied to the solenoid, and when the vehicle speed is increased and the steering angle is increased, the current supplied to the solenoid is decreased.

According to such a conventional method, no problem is posed under normal driving conditions. However, a reaction force from the tires is increased as the steering angle is increased. This poses a problem of a so-called "wall feeling" phenomenon. In this phenomenon, the steering force or resistance experienced by a driver is abruptly increased over a given steering angle.

SUMMARY OF THE INVENTION

It is, therefore, a principal object of the present invention to provide a method of controlling a power steering device, in which a uniform steering response is obtained throughout the entire driving range.

In order to achieve the above object, there is provided a method of controlling a power steering device, which controls an output from the power steering device in accordance with a vehicle speed and a steering angle, comprising the steps of, causing the output from the power steering device to be inversely proportional to the steering angle when the vehicle speed exceeds a predetermined vehicle speed and the steering angle is below a given angle, and causing the output from the power steering device to be proportional to the steering angle when the steering angle exceeds the given angle.

DETAILED DESCRIPTION OF THE PREFERRED EMBODIMENT

Figure 1:
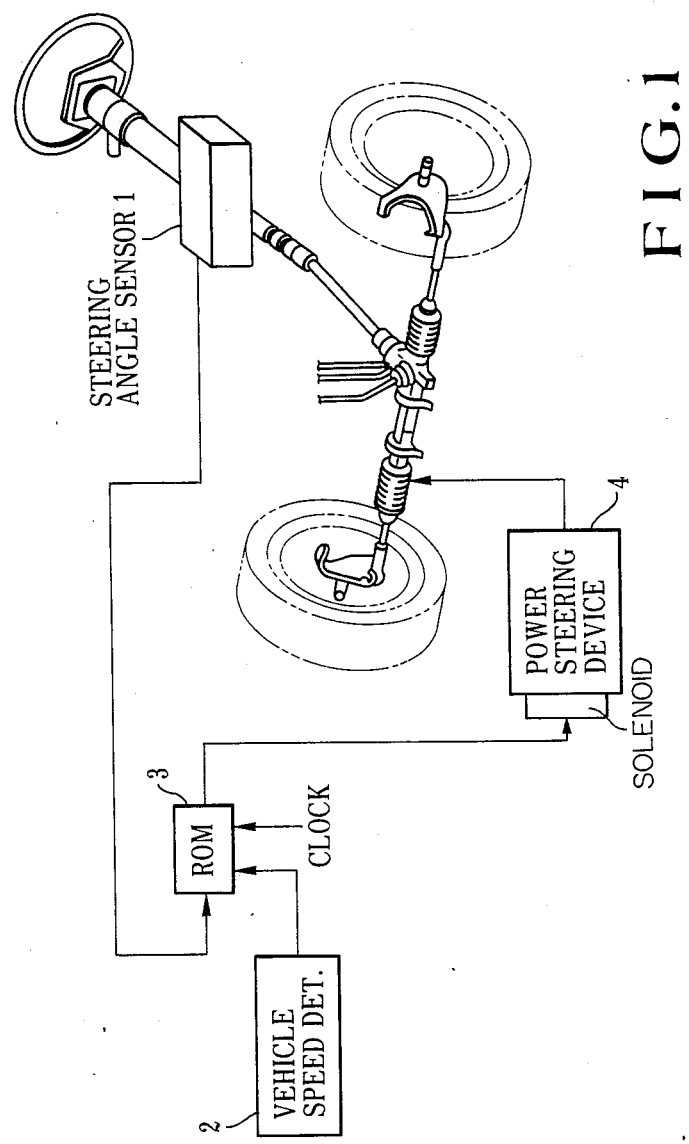
FIG. 1 is a block diagram of an embodiment of the present invention.
Figure 2:
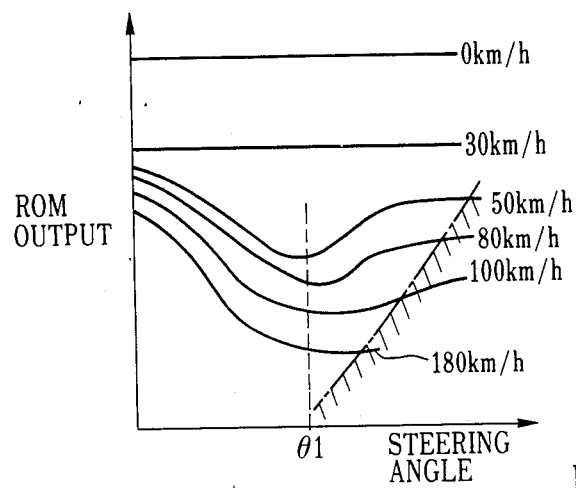
FIG. 2 is a graph of characteristics stored in a ROM.

FIG. 1 is a block diagram of an embodiment of the present invention. In FIG. 1, a signal representing a steering angle detected by a steering angle detector 1 and a signal representing a vehicle speed detected by a vehicle speed detector 2 are supplied to a ROM 3. Every time a clock signal clock is periodically supplied to the ROM 3, a value corresponding to a vehicle speed and a steering angle at that time is read out from the ROM 3. FIG. 2 shows characteristics of data stored in the ROM 3. The data content is a ratio to an output value obtained when the steering angle is zero at each given vehicle speed.

According to a device with the above arrangement, when the vehicle speed is 30 km/h or less, a constant value is read out from the ROM 30 even if the steering angle varies. Therefore, a current corresponding to a ROM output at that time is supplied to a solenoid (not shown) of the power steering device, thereby performing power steering.

On the other hand, when the vehicle speed exceeds 30 km/h, a value of the ROM output is decreased as the steering angle is increased up to a steering angle $\theta_1$, as shown in FIG. 2 for a vehicle speed of 50 km/hr. This value or data relating to this value is supplied to the solenoid of the power steering device. For this reason, when the vehicle speed is 50 km/h, the output from the power steering device is inversely proportional to the steering angle up to the steering angle $\theta_1$.

When the vehicle speed is 50 km/h and the steering angle exceeds $\theta_1$, a value of data read out from the ROM 3 is increased as the steering angle is increased. For this reason, when the vehicle speed exceeds 30 km/h and the steering angle exceeds $\theta_1$, the output from the power As shown in FIG. 2, for different vehicle speeds of 80, 100, and 180 km/hr., the predetermined angle at which the inflection occurs is distinct.

Figure 3:
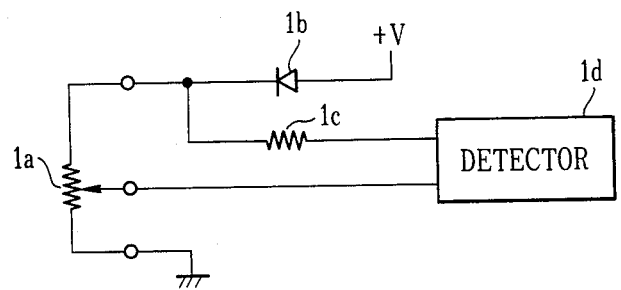
FIG. 3 is a circuit diagram of an example of a steering angle detector.
Figure 4:
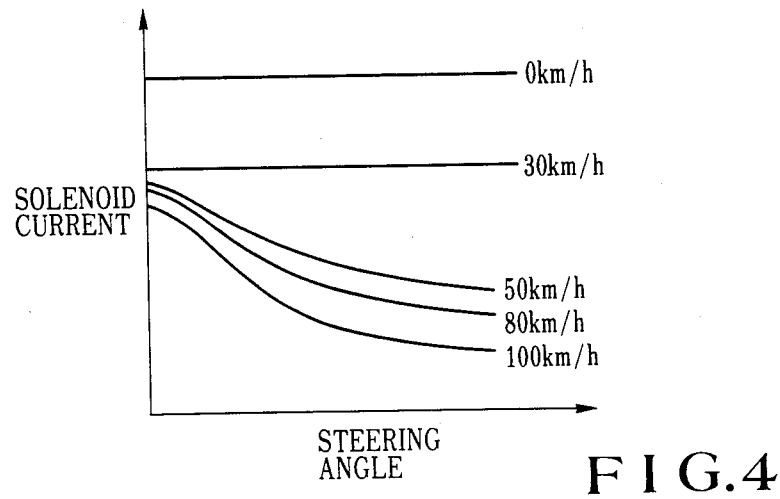
FIG. 4 is a graph of an example of characteristics of a conventional device.

FIG. 3 shows an example of the steering angle detector 1, in which reference numeral 1a denotes a variable resistor, a resistance value of which varies in accordance with movement of a steering wheel; 1b, a diode; 1c, a resistor; and 1d, a detector. The detector 1d detects a resistance of the variable resistor 1a as a steering angle at that time, and also detects a value half that of a voltage applied thereto through the resistor 1c as a steering center. With this arrangement, when a voltage drop across the diode 1b is varied due to a temperature change, the steering angle center can be reliably detected.

As has been described above, according to the present invention, when the vehicle speed exceeds a predetermined vehicle speed and the steering angle is below a given angle, the output from the power steering device is caused to be inversely proportional to the steering angle. When the steering angle exceeds the given angle, the output from the power steering device is caused to be proportional to the steering angle. Therefore, the increased steering force or resistance experienced by the driver when the steering angle is large is eliminated, and a small and uniform steering response can be effectively obtained throughout the entire driving range.

What is claimed is:

1. A method of controlling a power steering device, which controls an output from said power steering device in accordance with a vehicle speed and a steering angle, said method comprising the steps of:
    causing the output from said power steering device to vary inversely with the steering angle when the vehicle speed exceeds a predetermined vehicle speed and the steering angle is below a given angle; and
    causing the output from the power steering device to vary directly with the steering angle when the vehicle speed exceeds the predetermined vehicle speed and the steering angle exceeds the given angle.

2. The method of claim 1 wherein said power steering device includes a solenoid valve for controlling oil pressure in said device, and wherein said steps for causing each includes the step of controlling the current through the solenoid in accordance with vehicle speed and steering angle so that the current through the solenoid varies inversely with the steering angle when the vehicle speed exceeds the predetermined vehicle speed and the steering angle is below the given angle, and the current through the solenoid varies directly with the steering angle when the vehicle speed exceeds the predetermined vehicle speed and the steering angle exceeds the given angle.

3. A system for controlling the application of steering force in a power steering device, said system comprising:

means for detecting steering angle;

means for detecting vehicle speed;

means coupled to said steering angle detecting means and said vehicle speed detecting means for generating a power steering device control signal which varies inversely with the steering angle when the vehicle speed exceeds a predetermined vehicle speed and the steering angle is below a given angle, and which varies directly with the steering angle when the vehicle speed exceeds a predetermined vehicle speed and the steering angle exceeds the given angle.

4. The system of claim 3 wherein said control signal generating means comprises a memory device.

5. The invention of claim 4 wherein said memory device is a read only memory.

* * * * *